United States Patent [19]
Oshima et al.
[11] 3,715,507
[45] Feb. 6, 1973

[54] BILATERAL START-STOP TRANSMISSION SYSTEM FOR DIGITAL INFORMATION

[75] Inventors: Shintaro Oshima, Tokyo; Yukio Nakagome, Yokohama; Yasuo Fukata, Tokyo, all, Japan

[73] Assignee: Kokusai Denshin Denwa Kabushiki Kaisha, Tokyo-to, Japan

[22] Filed: May 26, 1972

[21] Appl. No.: 257,444

Related U.S. Application Data

[63] Continuation-in-part of Ser. No. 818,762, April 23, 1969, abandoned.

[30] Foreign Application Priority Data

July 22, 1968 Japan ..............................43/051372

[52] U.S. Cl. ................................179/15 BY, 178/58
[51] Int. Cl. ................................................H04j 5/00
[58] Field of Search ..........179/15 BY, 15 AS, 18 FC; 178/58

[56] References Cited

UNITED STATES PATENTS 3,564,144 2/1971 Diggelmann .....................179/15 BY
3,668,645 6/1972 Reymond .........................179/15 BY

*Primary Examiner*—Ralph D. Blakeslee
*Assistant Examiner*—David L. Stewart
*Attorney*—Robert E. Burns et al.

[57] ABSTRACT

A transmission system for bilaterally transmitting digital information of a first group of two-way communication channels to a second group of two-way communication channels, respectively, corresponding to the first group of two-way communication channels by the use of a pair of terminal equipments and a plurality of two-way start-stop telegraph lines therebetween, the number N of which is at least equal to the number $n$ of the two-way communication channels in each group. The digital information of a plurality of first one-way communication channels is temporarily stored at a memory device and then transmitted, after determination of active one-way communication channels to be connected to the two-way start-stop telegraph lines, from one of the terminal equipments to the other in a characterwise manner, so that the stored digital information of the determined active one-way communication channels is successively allocating to idle character periods of the two-way start-stop telegraph lines in a predetermined order of the active one-way communication channels and of the two-way start-stop telegraph lines so as to have particular polarities of start and stop elements distinct from those of the two-way communication channels. The transmitted digital information of the active one-way communication channels is distributed at the other of the terminal equipments to a plurality of active channels of the second one-way communication channels corresponding respectively to the first one-way communication channels by the use of control information indicative of the determined active first one-way communication channels and transmitted from one of the terminal equipment. The digital information of a plurality of third one-way communication channels is similarly transmitted from the other to the one of the terminal equipments to distribute to a plurality of fourth one-way communication channels.

This invention relates to a transmission system for transmitting digital information of a plurality of bilateral channels through a plurality of start-stop telegraph lines.

1 Claim, 8 Drawing Figures

| CHARACTER NO. | $C_1$ | $C_2$ | $C_3$ | $C_4$ | $C_5$ | $C_6$ | $C_7$ |
|---|---|---|---|---|---|---|---|
| SIGNAL ELEMENT No. | 1 2 3 4 5 | 1 2 3 4 5 | 1 2 3 4 5 | 1 2 3 4 5 | 1 2 3 4 5 | 1 2 3 4 5 | 1 2 3 4 5 |
| CHANNEL No. | 1 2 3 4 | 5 6 7 8 | 9 10 11 12 | 13 14 15 16 | 17 18 19 20 | 21 22 23 24 | 25 26 27 28 |
| ACTIVE CHANNEL | 0 0 1 0 0 | 0 1 0 0 0 | 0 0 1 0 0 | 0 0 0 1 0 | 0 0 0 0 0 | 0 0 0 0 0 | 0 0 0 0 0 |

Fig. 4

| | I | II | III | IV | V | VI | VII |
|---|---|---|---|---|---|---|---|
| 1 | | #15 (1) | #15 (2) | #5 (4) | | #2 (7) | |
| 2 | | | #2 (3) | | | #5 (7) | #10 (8) |
| 3 | #2 (1) | | | #10 (4) | #15 (5) | | |
| 4 | | #2 (2) | | | #2 (6) | #10 (7) | #15 (8) |
| 5 | | | #5 (3) | #15 (4) | | | |
| 6 | | | | | | #15 (7) | #2 (8) |
| 7 | #5 (1) | #5 (2) | #10 (3) | #2 (5) | | | |
| 8 | #10 (1) | | #15 (3) | | #5 (6) | | |
| 9 | | | | #5 (5) | #10 (6) | #2 (8) | |
| 10 | | | #2 (4) | | | | |
| 11 | | #10 (2) | | #10 (5) | #15 (6) | #5 (8) | #5 (8) |

Fig. 5

BILATERAL START-STOP TRANSMISSION SYSTEM FOR DIGITAL INFORMATION

This application is a continuation in part of our copending application, Ser. No. 818,762 filed on Apr. 23, 1969, and now abandoned.

It is desirable to use transmission lines at their higher efficiency if the number of transmission lines is relatively smaller than that of messages to be transmitted and the cost of the transmission lines is relatively high. For example, a transmission circuit transmissible of information in a two-way system, such as a teleprinter exchange service, is usually a four-wire circuit. In this teleprinter exchange service however, since a party carries out "transmitting" or "receiving" only even if a transmission line of the two-way system is used, one of the two directions of the two-way system is always in the idle condition.

An object of this invention is to provide a bilateral transmission system transmissible of digital information of a plurality of two-way channels and of one-way channel's through a plurality of start-stop telegraph lines the number of which is at least equal to the number of two-way channels.

In accordance with a feature of this invention, respective idle character periods of a plurality of start-stop telegraph lines are successively selected in a predetermined order to transmit at the respective idle character periods digital information of one-way active communication channels having messages to be transmitted, and control information identifying the selected one-way channels is transmitted through a control line in particular signal configuration of polarities of the start and stop elements thereof distinct from those of the two-way communication channels so that transmitted digital information of the active one-way channels is received in view of the particular signal configuration and the control information, whereby the above-mentioned object of this invention can be attained.

The principle of this invention will be better understood from the following more detailed discussion taken in conjunction with the accompanying drawings, in which the same or equivalent parts are designated by the same reference numerals, characters and symbols, and in which:

FIG. 4 is a diagram explanatory of a signal configuration of a frame of control signals transmitted to common control lines in the system of this invention;

FIG. 5 is a diagram explanatory of the transmission order of signals in start-stop telegraph lines in the system of this invention;

Figure 1:
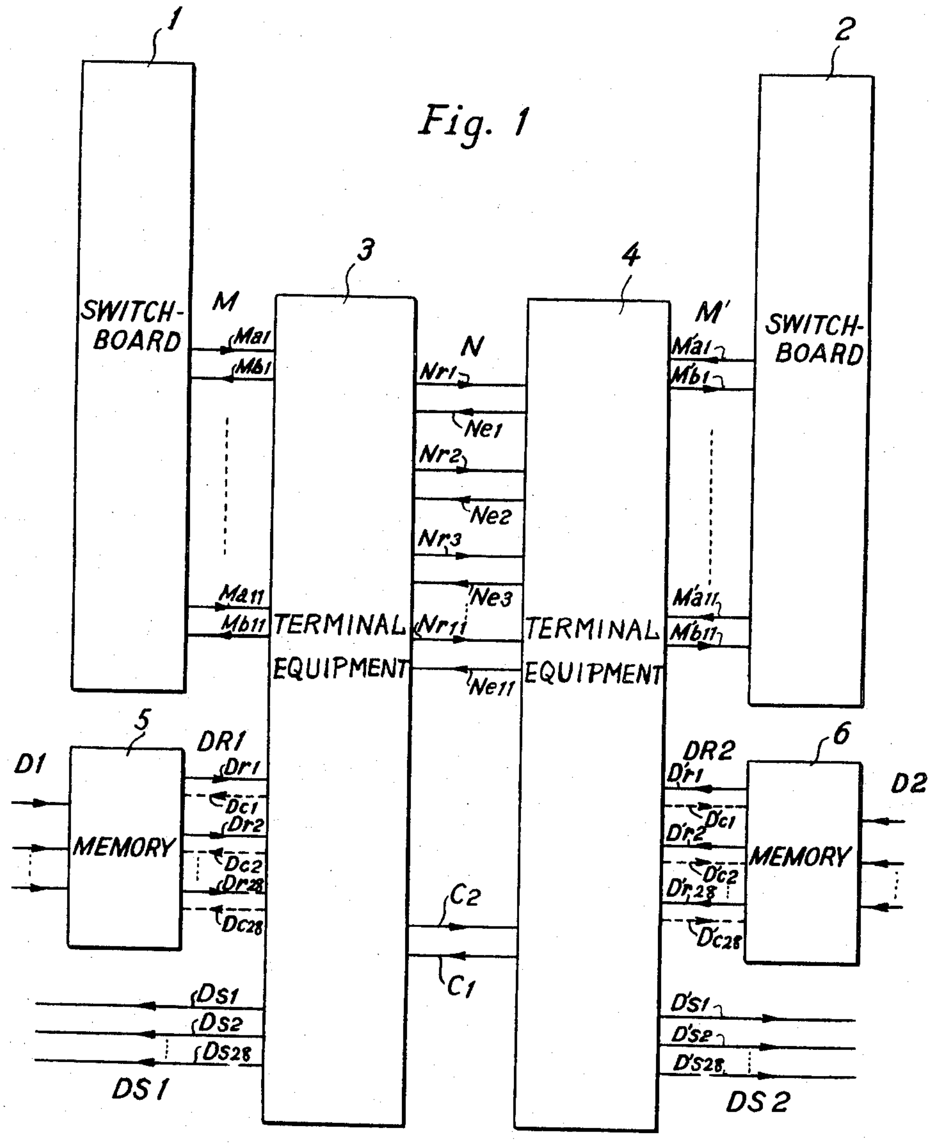
FIG. 1 is a block diagram illustrating an example of a digital transmission system formed in accordance with this invention.

With reference to FIG. 1, the principle of this invention will first be described. Each of switchboards 1 and 2 switches respective digital information (e.g., five-unit start-stop signals) of input channels (not shown) so as to obtain switched two-way circuits M or M' and each of terminal equipments 3 and 4 controls timing for allocating the above mentioned digital information to be transmitted to two-way start-stop telegraph lines N as mentioned below. The feature of this invention is attained by these terminal equipments 3 and 4. Memories 5 and 6 store temporarily digital information of one-way data circuits D1 or D2. Start-stop telegraph lines N comprises a plurality of four-wire circuits (Nr1, Ne1), (Nr2, Ne2), (Nr3, Ne3), (Nr4, Ne4), . . . Nr11, Ne11), the number of which is at least equal to the number of switched two-way circuits M. Pairs of arrow lines (Ma1, Mb1), . . . (Ma11, Mb11) show two-way circuits M connecting between the switchboard 1 and the terminal equipment 3, and pairs of arrow lines (M'a1, M'b1) . . . (M'a11, M'b11) show two way circuits M' connecting between the switchboard 2 and the terminal equipment 4. A group of one-way data circuits DR1 comprises data receiving lines Dr1, Dr2, . . . Dr28 of the terminal equipment 3 and data control lines Dc1, Dc2, . . . Dc28; and a group of one-way circuits DR2 comprises data receiving lines D'r1, D'r2, . . . D'r28 of the terminal equipment 4 and data control lines D'c1, D'c2, . . . D'c28. A group of one-way data circuits DS1 comprises data sending lines Ds1, Ds2 . . . Ds28 of the terminal equipment 3; and a group of one-way data circuits DS2 comprises data sending lines D's1, D's2, . . . D's28 of the terminal equipment 4. Common control lines $C_1$ and $C_2$ serve to transmit control information between the terminal equipments 3 and 4 in synchronism with the same timing of the start-stop telegraph lines N.

In this case, respective four-wire circuits (Ma1, Mb1), . . . Ma11, Mb11) of the group of start-stop telegraph lines M correspond vis-a-vis to respective four-wire circuits (M'a1, M'b1), . . . (M'a11, M'b11) of the group of start-stop telegraph lines M'; respective data receiving lines Dr1, Dr2, . . . Dr28 of the group of lines DR1 correspond vis-a-vis to the data sending lines D's1, D's2, . . . D's28 of the group of lines DS2; and respective data receiving lines D'r1, D'r2, . . . D'r28 of the group of lines DR2 correspond vis-a-vis to the data sending lines Ds1, Ds2, . . . Ds28 of the group of lines DS1. In other words, if digital information is transmitted from the switchboard 1 through the line Ma1, the terminal equipment 3, the group of start-stop telegraph lines N and the terminal equipment 4 by way of example, this digital information is sent out though the transmission line M'b1. Similarly, lines M'a1, Dr1 and D'r1 are connected respectively to lines Mb1, D's1 and Ds1 by way of examples.

In the system of this invention, the terminal equipment 3 has *m* (39 in this example) input start-stop telegraph circuits Ma1, Ma2, Ma3, . . . Ma11, Dr1, Dr2, . . . Dr28 the number *m* of which ic more than the number *n* (11 in this example) of output start-stop telegraph lines Nr1, Nr2, Nr3, . . . Nrn in the transmission direction from the terminal equipment 3 to the terminal equipment 4. In other words, there exists a condition where the number *m* is larger than the number *n*. In this case, each of the group of start-stop telegraph lines N is used in fixed connections to the two-way circuits M, M'. Moreover, the start-stop telegraph lines N is also commonly the one way control lines DR1 and DR2. Accordingly, respective data transmission from the group of lines M and DR1 to the group of lines M' and DS2 is performed by the common use of the group of start-stop telegraph lines N in a time-divisional manner mentioned below. However, it is necessary to be sensible of what start-stop telegraph line (Nr1, Nr2, . . . or Nr11) transmits the digital information of each of the input channels (M and DR1). Control information is transmitted for this purpose from the terminal equipment 3 to the terminal equipment 4 through the control line $C_2$.

Moreover, digital information is transmitted at the automatic speed from the switchboard 1, while one way data from the memory 5 are received at the terminal equipment 3 in a characterwise manner by sending control pulses through respective control lines Dc1, Dc2, Dc28. Each of the control pulses is sent out in response to completion of the just preceding character of the corresponding channel in the equipment 3. In the system of this invention, since delayed transmission of information of the bilateral communication circuits (M and M') is not allowable, this transmission of information of the bilateral communication circuits (M and M') is performed, with priority against the transmission of information of the data channels (D1 and D2).

The above is described with respect to the transmission from the terminal equipment 3 to the terminal equipment 4. The reverse transmission from the terminal equipment 4 to the terminal equipment 3 is also similarly performed since the system of this invention is symmetrically constructed with respect to the group of start-stop telegraph lines N. Accordingly, the below descriptions will be disclosed in view of only one of two transmission directions except the case of a proviso.

In the common control lines $C_1$ and $C_2$, five-unit start-stop telegraph signals are transmitted. Start-stop telegraph signals transmitted in the common control lines $C_1$ and $C_2$. Moreover, each start-element and each stop element of the start-stop telegraph signals transmitted in the common control lines $C_1$ and $C_2$ have not respective fixed polarities but have particularly controlled polarities, so that the start-stop telegraph signals transmitted in the common control lines $C_1$ and $C_2$ have the following five different types:

CH(a): a normal character of two-way teleprinter exchange service;

CH(b): a character including five bits of information of a channel of one-way store and exchange serive and having start and stop elements indicative of an all mark condition of a channel of two-way teleprinter exchange service;

CH(c): a character including five bits of information of a channel of one-way store and exchange service and having start and stop elements indicative of an all space condition of a channel of two-way teleprinter exchange service;

CH(d): a character excluding information of one-way store and exchange service and having start and stop elements indicative of an all mark condition of a channel of two-way teleprinter exchange service; and CH(e): a character excluding information of one-way store and exchange service and having start and stop elements indicative of an all space condition of a channel of two-way teleprinter exchange service.

Figure 2:
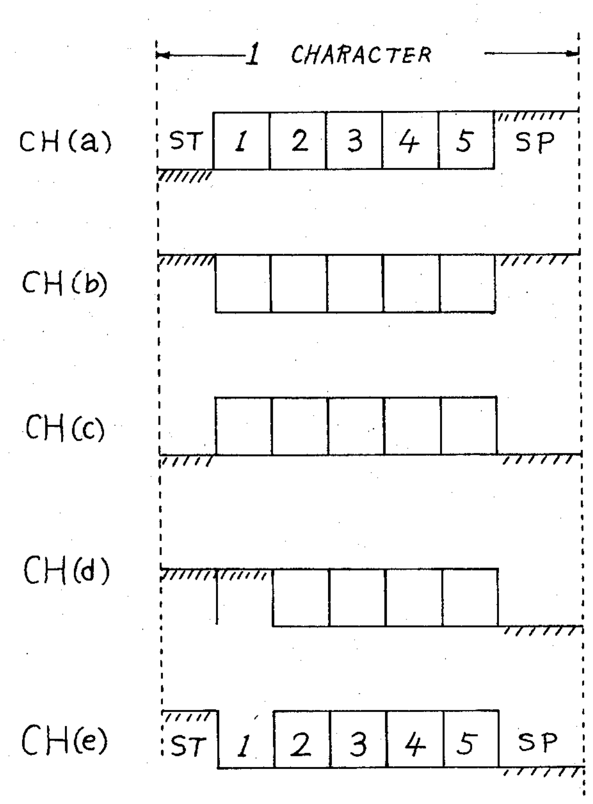
FIG. 2 shows diagrams illustrating signal configurations of characters transmitted to the start-stop telegraph lines in the system of this invention.

The terminal equipments 3 and 4 always detect respective circuit conditions of the two-way communication circuits M and M' and one-way data circuits $DR_1$ and $DR_2$, so that any one of the above mentioned five types of signals is transmitted in each of the start-stop telegraph lines N. The five types of signals CH(a), CH(b), CH(c), CH(d) and CH(e) are shown in FIG. 2, in which signals CH(a), CH(d) and CH(e) are employed only in the two-way teleprinter exchange service while signals CH(b) and CH(c) are employed also in the one-way store and exchange service as mentioned below. In FIG. 2, elements indicated by partial hatching have fixed polarities indicated.

Figure 3:
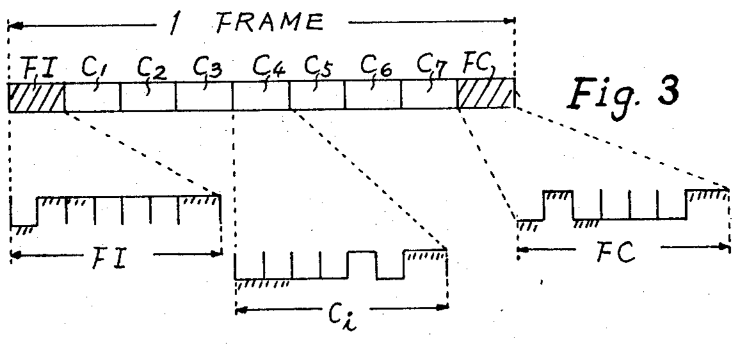
FIG. 3 is time charts explanatory of signal configurations of characters transmitted to common control lines in the system of this invention.

The common control lines $C_1$ and $C_2$ are employed for performing character synchronization with start-stop signals of the start-stop telegraph lines N and for transmitting control information indicative of existence or non-existence of messages of the one-way communication circuits M(or M') from one to the other of the terminal equipments 3 and 4. Characters of the control information are transmitted in the common control lines $C_1$ and $C_2$ in a frame-wise manner as shown in FIG. 3. One frame is constructed by nine character periods including a frame initial character FI, seven control characters $C_1$, $C_2$, $C_3$, $C_4$ $C_5$, $C_6$ and $C_7$, and a frame-check character FC. A first bit in five elements of each control character $C_1$, $C_2$, . . . or $C_7$ is an identifying element, and other four bits are employed for transmitting the above mentioned control information indicative of existence or non-existence of messages of the one-way communication circuits M(or M').

An example of the control information is shown in FIG. 4 for 28 one-way communication circuits. In FIG. 4, a first line is "character number" $C_1$, $C_2$, . . . $C_7$, a second line "signal element number" 1, 2, 3, 4 and 5 in each character, a third line "channel number" 1 to 28, and a fourth line "active channel" indicated by "1" at columns corresponding to the active channels while "0" indicates inactive channels. If it is assumed that control information indicative of active one-way communication channels determined at the last of an $(i-1)$ frame is transmitted in an $i$ frame, messages of the determined active one-way communication channels are actually transmitted in an $(i + 1)$ frame at idle character periods so as to assume signal configurations CH(b) and CH(c).

The order of transmitting the character of the above mentioned active one way communication, channels in the start-stop telegraph lines N is shown in FIG. 5, in which four channels Nos. 2, 5, 10, and 15 are active one-way channels. In FIG. 5, lines 1 to 11 correspond respectively to start-stop telegraph lines 1 to 11, while columns I, II, III, . . . VII, . . . correspond respectively to a first character, a second character, . . . , a seventh character, . . . in each lines 1 to 11. Empty rectangular sections are fixedly assigned to respective start-stop telegraph lines to transmit messages of respective two-way communication channels M and M' in the signal configuration CH(a). Numbers (1), (2), (3), . . . (8), . . . are the order number of each active one-way channel Nos. 2, 5, 10, or 15. Any of the empty rectangular sections may assume the signal configurations CH(d) and CH(e).

The construction of the system of this invention in which information is messages and control signal are transmitted between the terminal equipment 3 and 4 by the use of start-stop telegraph lines N and the control lines $C_1$ and $C_2$, will now be described with reference to FIG. 6. The example of the terminal equipment (3 or 4) shown in FIG. 6 operates in a time-divisional manner, and comprises: a counter 10 counting clock pulses from a clock pulse generator 9 so as to be used as the clock timing of the time divisional operation of the equipment 3 or 4; a scanner 11 scanning input channels Ma1, Ma2, . . . Ma11, Dr1, Dr2, . . . Dr28, Ne1, . . . Ne11 and C1 so as to produce an aggregate signal; a one-bit register 17 temporarily storing one bit of the aggregate signal from the scanner 11 for each bit; a register 18 provided with a plurality of memory zones employed for performing signal conversion as mentioned below and temporarily storing digital information of the input and output channels when read out from a memory 14 mentioned below; a distributor 12 connected to the register 18 for distributing processed signals to output channels Mb1, Mb2, . . . Mb11, Ds1, Ds2, . . . Ds28, Nr1, . . . Nr11 and C2; a distributor 13 connected to the register 18 for distributing drive pulses to the memory 5 through the control lines Dc1, Dc2, . . . Dc28; a memory 14 connected to the scanner 11 through the register 17 and the register 18 for storing the digital information of the input and output channels including the control lines by the use of the aggregate signal; an address switch 16–0 which selects normally the output of the counter 10 and selects outputs of control circuits 16–1 and 16–2 mentioned below in response to them, an address selector 15 for designating desired memory zones of the memory 14 in accordance with the output of the address switch 16–0; a register 19 connected to the memory 14 and the register 18 for temporarily storing the digital information stored in the register 18 to transfer from a memory zone of the memory 14 corresponding to one of the input lines Ma1, . . . Ma11, Dr1, Dr2, . . . Dr28 (or Ne1, . . . Ne11) to another of a memory zone of the memory 14 corresponding to one of the output lines Nr1, . . . Nr11 (or Mb1, . . . Mb11, Ds1, Ds2, . . . Ds28), a control circuit 16–1 employed for indicating active one-way channels mentioned above in successive three frames and for converting polarities of the start and stop elements of the active one-way channels from the signal configuration CH(a) to any one of the signal configurations CH(b) or CH(c) or for converting polarities of the start and stop elements of the two-way communication channels of all mark or all space to any one of the signal configurations CH(d) or CH(e); a control circuit 16–1 for indicating active one-way channels in an instant frame and in an immediately succeeding frame and for distributing the transmitted characters of the two-way start-stop telegraph lines Ne1 to Ne11 to the output channels (Mb1 to Mb11) or (Ds1 to Ds28) in view of the signal configurations CH(a) to CH(e) after restoration of polarities of the start and stop elements to respective normal polarities; a detection circuit 16–3 employed for detecting the active one-way communication channels from the input way-way communication channels Dr1 to Dr28; and flip-flop 20–1 and 20–2 employed for synchronizing start-stop telegraph signals transmitted in the common control lines $C_1$ and $C_2$ with start-stop telegraph signals transmitted in the start-stop telegraph lines N. The memory 14 comprises a buffer memory 14–1 having memory zones corresponding respectively to the group of lines M (or M′), a buffer memory 14–2 having memory zones corresponding respectively to the groups of lines DR1 and DS1 (or DR2 and DS2), a buffer memory 14–3 having memory zones corresponding to the group of start-stop telegraph lines N, and a buffer memory 14–4 having memory zones corresponding respectively to the control lines $C_1$ and $C_2$. The buffer memories 14–1, 14–2, 14–3 and 14–4 have both-way paths connected to the registers 18 and 19.

Before detailed description of the actual construction and operations of the embodiments shown in FIG. 6, another example of the equipments 3 and 4 realized in a space arrangement is described with reference to FIG. 7 for ready understanding of the principle of the equipments 3 and 4.

Figure 7:
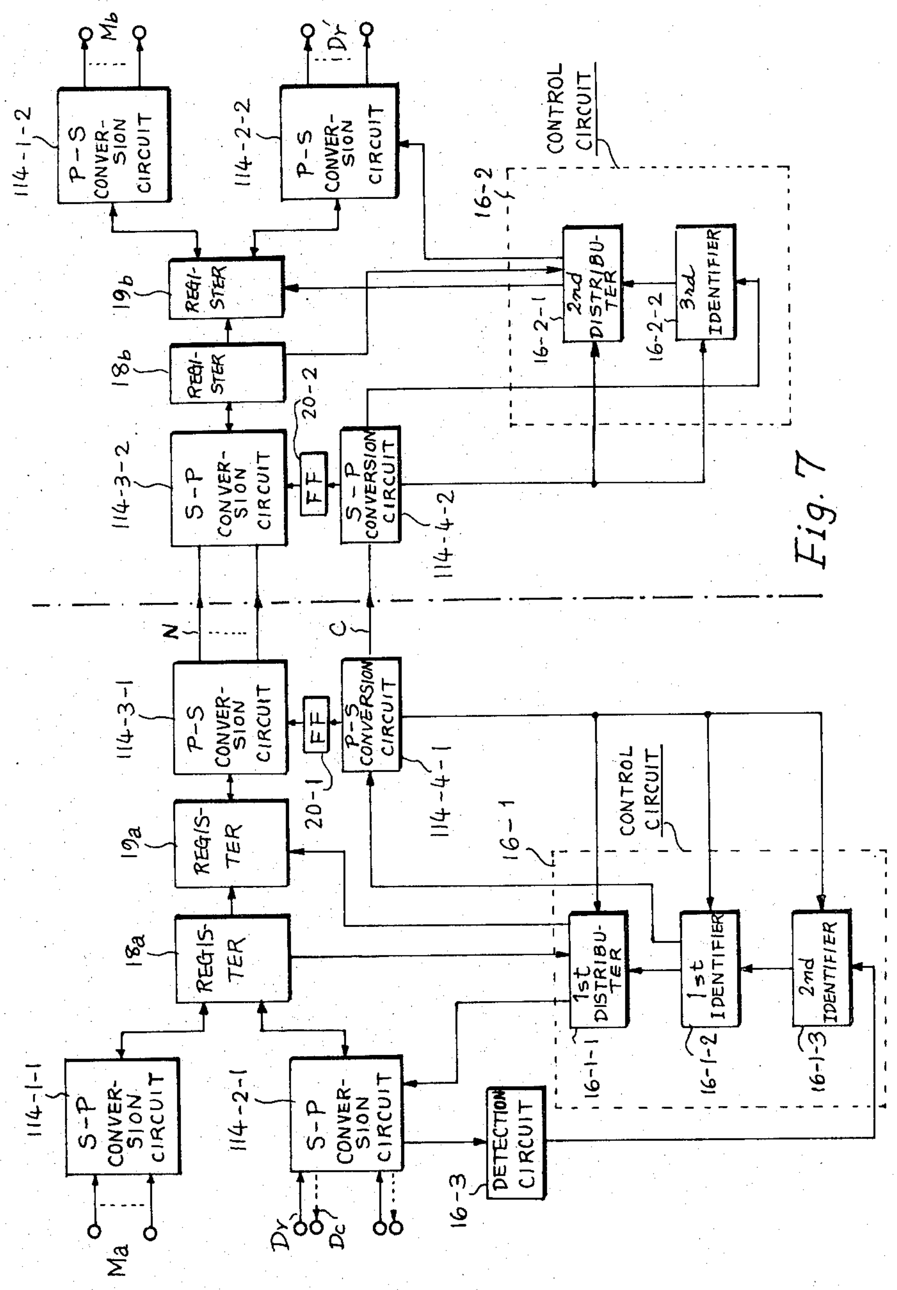

In FIG. 7, a serial-parallel conversion circuit 114–1–1 includes the buffer memory 14–1 and performs serial-to-parallel signal conversion for serial telegraph signals of the start-stop telegraph channels Ma. A serial-parallel conversion circuit 114–2–1 includes the buffer memory 14–2 and performs serial-to-parallel signal conversion for serial telegraph signals of the one-way telegraph channels Dr in addition to sending out of drive pulses to drive lines Dc. A parallel-serial conversion circuit 114–1–2 includes the buffer memory 14–1 and performs parallel-to-serial signal conversion for telegraph signals to be sent out to the start-stop telegraph channels Mb. A parallel-serial conversion circuit 114–2–2 includes the buffer memory 14–2 and performs parallel-to-serial signal conversion for telegraph signals to be sent out to the one-way telegraph channels Dr′. A parallel-serial conversion circuit 114–3–1 includes the buffer memory 14–3 and performs parallel-to-serial signal conversion for start-stop telegraph signals to be transmitted to the start-stop telegraph lines N. A parallel-serial conversion circuit 114–3–2 includes the buffer memory 14–3 and performs serial-to-parallel signal conversion for start-stop telegraph signals transmitted through the start-stop telegraph lines N. A parallel-serial conversion circuit 114–4–1 includes the buffer memory 14–4 and performs parallel-to-serial signal conversion for control signals transmitted to the common control line C. A serial-parallel conversion circuit 114–4–2 includes the buffer memory 14–4 and performs serial-to-parallel signal conversion for the control signal transmitted through the common control line C. The buffer memories 14–1, 14–2, 14–3 and 14–4 included in the conversion circuits 114–1–1, 114–1–2, 114–2–1, 114–2–2, 114–3–1, 114–3–2, 114–4–1 and 114–4–2 as mentioned above comprise each memory words corresponding to handled channels. The control circuit 16–1 comprises a first distributer 16–1–1, a first identifier 16–1–2 and a second identifier 16–1–3. The first distributer 16–1–1 comprises a register REG–1 for indicating binary information shown at the fourth line in FIG. 4 to represent the active one-way telegraph channels at an instant frame ($i$–1), a counter COUNT–1 having a variable scale preset so as to correspond to the number of active channels at the start of each frame so that the counting states of the counter COUNT successively indicate the order numbers of transmitted one-way telegraph channels, a detector DET for detecting whether or not a character is completed in the register 18*a*, a bistable circuit BC–1 assuming one of two possible states respectively corresponding to readout from the conversion circuit 114–1–1 to the register 18*a* and readout from the conversion circuit 114–2–1 to the register 18*a*, and five read-only memories $RM_1$ to $RM_5$ for respectively generating start elements and stop elements of characters CH(a), CH(b), CH(c), CH(d) and CH(d). The first identifier 16–1–2 comprises a register REG–2 for indicating the active one-way telegraph channels at an immediately succeeding frame *i*. The second identifier 16–1–3 comprises a register REG–3 for indicating the active one-way telegraph channels at a next but one frame ($i + 1$). A detection circuit 16–3 detects completion of one character in each of the memory words in the serial-parallel conversion circuit 114–2–1 as "active channel," so that the detected active channel is set in the second identifier 16–1–3. The respective contents of the registers REG–1, REG–2 and REG–3 of the identifiers 16–1–2 and 16–1–3 are successively shifted to the first distributer 16–1–1 and the first identifier 16–1–1 and the first identifier 16–1–2 in synchronism with the frame timing.

The control circuit 16–2 comprises a second distributer 16–2–1 and a third identifier 16–2–2. The second distributer 16–2–1 comprises a register REG–4 for indicating binary information representative of the active one-way telegraph channels at the next but one frame ($i + 1$), a counter COUNT–2 having a variable scale preset so as to correspond to the number of active channels at the start of each frame so that the counting states of the counter COUNT–2 successively indicate the order number of received telegraph channels, a bistable circuit BC–1 assuming one of two possible states respectively corresponding to readout from the register 19*b* to the conversion circuit 114–1–2 and readout from the register 19*b* to the conversion circuit 114–2–2 by detecting whether the signal configuration CH(a) circuit, and a read-only memory M for generating a normal start element, a normal stop element, a continuous mark signal and a continuous space signal. The third identifier 16–2–2 comprises a register REG–5 for indicating the active one-way telegraph channels received at the frame *i*.

Figure 8:
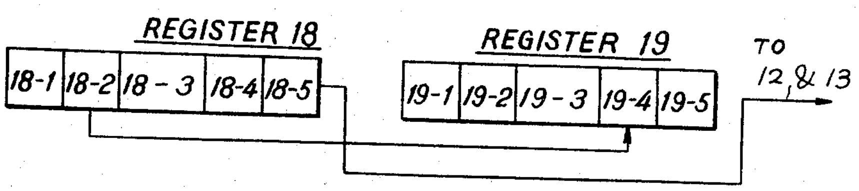
FIG. 8 is a diagram illustrating the construction of registers used in the system of this invention.

With reference to FIGS. 7 and 8, transmission of characters from the conversion circuits 114–1–1 and 114–2–1 to the conversion circuit 114–3–1 is described. The parallel-serial conversion circuit 114–3–1 has the memory words corresponding respectively to the start-stop telegraph lines N. When contents of one of the memory words of the parallel-serial conversion circuit 114–3–1 are read out to a register 19*a*, contents of corresponding one of the memory words of the serial-parallel conversion circuit 114–2–1 are read out to a register 18*a*. In this case, one of the following three steps (i), (ii) and (iii) is performed in accordance with the condition of the readout contents of the register 18*a*.

i. If one character is completed in the register 18*a*, five bits of the readout character except the start element and the stop element are read out from the register 18*a* to the register 19*a* so as to thereafter send out the transferred character to corresponding one of the start-stop telegraph lines N after adding a normal start element and a normal stop element by the first distributer 16–1–1 so as to obtain the signal configuration CH(a) shown in FIG. 2. The contents of the registers 18*a* and 19*a* are again stored in the conversion circuits 114–1–1 and 114–3–1 respectively.

ii. If one character is not completed in the register 18*a* by the detection of the first distributer 16–1–1, contents of a memory word of the serial-parallel conversion circuit 114–2–1 corresponding to one of the one-way telegraph channels are read out under control of the first distributer 16–1–1 to the register 18*a*. If one character is completed in the register 18*a* for the readout contents from the conversion circuit 114–2–1, five bits of the completed one character except the start element and the stop element are read out from the register 18*a* to the register 19*a* for thereafter sending out the readout character to one of the start-stop telegraph lines N after adding a start element and a stop element by the first distributer 16–1–1 so as to obtain the signal configuration CH(b) or CH(c).

iii. If one character is not completed in the register 18*a* for the readout contents from the conversion circuit 114–2–1, five bits of the contents of the register 18*a* are not read out to the register 19*a*. In this case, a character is thereafter sent out to one of the start-stop telegraph lines N under the signal configuration CH(d) or CH(e) shown in FIG. 2 after adding a start element and a stop element by the first distributer 16–1–1 so as to obtain the signal configuration CH(d) or CH(e).

Characters completed in the parallel-serial conversion circuit 114–3–1 as mentioned above and assuming signal configurations CH(a), CH(b), CH(c), CH(d) and CH(e) shown in FIG. 2 are transmitted simultaneously as shown in FIG. 5 in synchronism with the control characters of the common control line C.

Serial characters received by the serial-parallel conversion circuit 114–3–2 are converted to parallel characters and then read out to a register 18*b* for each parallel character. The contents of the memory words in the parallel-serial conversion circuit 114–1–2 are read out to a register 19*b* for each memory word in synchronism with read out timing of the conversion circuit 114–3–2. If a character having the signal configuration CH(a) and readout to the register 18*b* is detected by the second distributer 16–2–1, five bits of this detected character are read out from the register 18*b* to the register 19*b* and the conversion circuit 114–1–2 after adding a normal start element and a normal stop element at the register 19*b* by the second distributer 16–2–1 If a character having the signal configuration CH(b) or CH(c) and readout to the register 18*b* is detected by the second distributer 16–2–1, five bits of this detected character are read out from the register 18*b* to the register 19*b* and the conversion circuit 114–2–2 after adding a normal start element and a normal stop element at the register 19*b* by the second distributer 16–2–1 while a continuous mark signal or a continuous space signal is applied from the second distributer 16–2–1 to the conversion circuit 114–1–2 through the register 19*b* in accordance with the signal configuration CH(b) or CH(c). If a character having the signal configuration CH(d) or CH(e) and readout to the register 18b is detected by the second distributer 16–2–1, five bits of this detected character are not read out from the register 18b to the register 19b, while a continuous mark signal is applied from the second distributer 16–2–1 to the conversion circuit 114–1–2 through the register 19b in accordance with the signal configuration CH(d) or CH(e).

Figure 6:
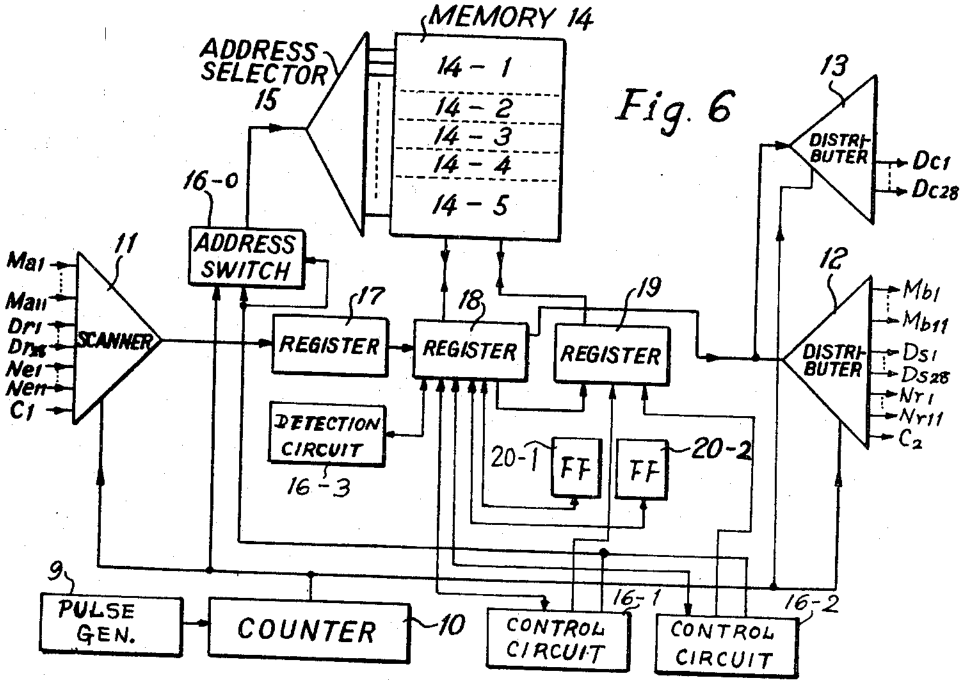
FIGS. 6 and 7 are block diagrams each illustrating an example of a terminal equipment used in the system of this invention.

The example shown in FIG. 6 is constructed for performing the function of the example shown in FIG. 7 in a time-divisional manner for 51 inputs (Ma1 to Ma11, Dr1 to Dr28, Ne1 to Ne11, and C1) and for 51 outputs (Mb1 to Mb11, Ds1 to Ds28, Nr1 to Nr28, and C2) plus 28 drive-pulse outputs (Dc1 to Dc28) after providing the buffer memories 14–1, 14–2, 14–3, and 14–4 in a set of memory 14.

With reference to FIG. 8, operations of the embodiment shown in FIG. 6 are described. The 50 inputs are scanned by the scanner 11 in accordance with counting states of the counter 10, which counts clock pulses from the pulse generator 9. An aggregate signal obtained by the scanning of the scanner 11 is applied to the register 17. When a bit of binary information obtained from one of the inputs is applied to the register 17, a memory word of the memory 14 corresponding to the selected one of the inputs is read out to the register 18 at the same time. The contents of the register 18 comprises, as shown in FIG. 8, a state indicator 18-3 indicative of either "serial-to-parallel conversion" or "-parallel-to-serial conversion," a serial memory 18–1 employed for serial-to-parallel signal conversion, a parallel memory 18–2 employed for serial-to-parallel signal conversion, a parallel memory 18–4 employed for parallel-to-serial signal conversion, and a serial memory 18–5 employed for parallel-to-serial signal conversion. The contents of the register 19 are the same as the register 18 as shown in FIG. 8. For the serial-to-parallel signal conversion, a parallel character is completed from contents of the serial memory 18–1 and a bit of binary information of the register 17 at least during five readout periods of the memory 14 in view of five-unit start-stop telegraph signals of the 50 inputs. When one character is completed in the register 18 for one of the 50 inputs, the completed character is transferred from the register 18 to the register 19. For the serial-to-parallel signal conversion of the one-way channels Dr1 to Dr28, drive pulses are further applied from the distributer 13 to the control lines Dc1 to Dc28 in synchronism with the scanning of the corresponding inputs Dr1 to Dr28. For the parallel-to-serial signal conversion, a parallel character provided in the parallel memory 18–4 is transferred to the serial memory 18–5 if the serial memory 18–5 is unoccupied, so that the serial character is sent out from the serial memory 18–5 to a corresponding output through the distributer 12.

The above mentioned serial-to-parallel signal conversion and parallel-to-signal conversion are time-divisionally performed for the inputs and the outputs. Transmission of characters to the outputs are performed all together in synchronism with change to the state "1" of the flip-flop circuit 20–1, which assumes the state "1" in response to a start of a control character to the control line $C_2$. This operation will be also understood from the example shown in FIG. 7. The flip-flop 20–2 is employed for indicating a receiving period of all inputs by the state "1" thereof. The above mentioned state "1" of each of the flip-flop 20–1 and 20–2 is held during a time between adjacent carry pulses of the counter 10. Operations relating to the control circuits 16–1 and 16–2 and the detection circuit 16–3 are performed similarly to those of the example shown in FIG. 7 but in a time divisional manner.

What we claim is:

1. A transmission system for bilaterally transmitting digital information, comprising:

means defining a first group of two-way communication channels;

means defining a second group of two-way communication channels;

a pair of terminal equipment means respectively connected to said first and second groups of two-way communication channels;

at least one two-way common control line and a plurality of two-way start-stop telegraph lines connected between said terminal equipment means, start-stop telegraph signals of said two-way start-stop telegraph lines being synchronized with the timing of said common control line, the number of said two-way start-stop telegraph lines being at least equal to the number of said two-way communication channels in each group;

means defining a first group of one-way communication channels and having first memory means for temporarily storing binary information of said first group of one-way communication channels, said first group of one-way communication channels being connected through said first memory means to one of said terminal equipment means;

means defining a second group of one-way communication channels and having second memory means for temporarily storing binary information of said second group of one-way communication channels, said second group of one-way communication channels being connected through said second memory means to the other of said terminal equipment means;

each of said terminal equipment means comprising third memory means coupled to one group of said two-way communication channels, one group of said one-way communication channels, said two-way telegraph lines and said common control line for receiving and temporarily storing the digital information of said two-way communication channels, active ones of said one-way communication channels, said two-way telegraph lines and said common control line in a characterwise manner; detection means connected to said third memory means for detecting from said one-way communication channels said active channels having the digital information to be transmitted to said two-way start-stop telegraph lines; first distributing means connected to said third memory means, said two-way communication channels, said one-way communication channels and said common control line for distributing the digital information of one group of said two-way communication channels and said determined active channels of one group of said one-way communication channels to said two-way communication channels, control information indicative of said determined active one-way channels being applied to said common control line; control means connected to said third memory means and said detection means for connecting said active channels of said one-way data channels to said third memory means; signal conversion means connected to said third memory means for converting signal configuration of the digital information of said active channels to particular signal configuration which is distinct with respect to start and stop elements thereof from the signal configuration of the digital information of said two-way communication channels; and second distribution means connected to said third memory means said two-way start-stop telegraph lines, said one way communication channels and said common control line for distributing the digital information of said two-way telegraph lines having said particular signal configuration to one group of said one-way communication channels in view of said control information transmitted.

* * * * *